United States Patent
Yu et al.

(10) Patent No.: US 9,020,922 B2
(45) Date of Patent: Apr. 28, 2015

(54) SEARCH ENGINE OPTIMIZATION AT SCALE

(75) Inventors: Jimmy Yu, Foster City, CA (US);
Sammy Yu, San Mateo, CA (US);
Lemuel S. Park, Cerritos, CA (US);
Rolland Yip, Foster City, CA (US)

(73) Assignee: Brightedge Technologies, Inc., San Mateo, CA (US)

( * ) Notice: Subject to any disclaimer, the term of this patent is extended or adjusted under 35 U.S.C. 154(b) by 78 days.

(21) Appl. No.: 12/853,884

(22) Filed: Aug. 10, 2010

(65) Prior Publication Data

US 2012/0041936 A1 Feb. 16, 2012

(51) Int. Cl.
*G06F 17/30* (2006.01)

(52) U.S. Cl.
CPC .... *G06F 17/30864* (2013.01); *G06F 17/30929* (2013.01)

(58) Field of Classification Search
None
See application file for complete search history.

(56) References Cited

U.S. PATENT DOCUMENTS

| | | | | |
|---|---|---|---|---|
| 5,835,087 | A * | 11/1998 | Herz et al. | 715/810 |
| 6,629,097 | B1 * | 9/2003 | Keith | 1/1 |
| 7,640,254 | B2 | 12/2009 | McConnell | 1/1 |
| 7,693,827 | B2 * | 4/2010 | Zamir et al. | 707/999.003 |
| 7,827,170 | B1 * | 11/2010 | Horling et al. | 707/722 |
| 7,890,533 | B2 * | 2/2011 | Pollara | 707/790 |
| 8,341,017 | B2 * | 12/2012 | Payne et al. | 705/14.43 |
| 8,386,509 | B1 * | 2/2013 | Scofield et al. | 707/769 |
| 8,463,790 | B1 * | 6/2013 | Joshi et al. | 707/738 |
| 8,515,937 | B1 * | 8/2013 | Sun et al. | 707/707 |
| 8,589,395 | B2 * | 11/2013 | Singh | 707/736 |
| 8,924,558 | B2 * | 12/2014 | Gross | 709/226 |
| 2002/0198882 | A1 * | 12/2002 | Linden et al. | 707/10 |
| 2003/0217052 | A1 * | 11/2003 | Rubenczyk et al. | 707/3 |
| 2005/0108001 | A1 * | 5/2005 | Aarskog | 704/10 |
| 2006/0117002 | A1 | 6/2006 | Swen | |
| 2006/0224577 | A1 | 10/2006 | Hullender et al. | |
| 2007/0016564 | A1 | 1/2007 | Chou | |
| 2007/0088692 | A1 | 4/2007 | Dean et al. | |
| 2007/0143266 | A1 * | 6/2007 | Tang et al. | 707/3 |
| 2007/0143283 | A1 * | 6/2007 | Spencer et al. | 707/5 |
| 2007/0233671 | A1 * | 10/2007 | Oztekin et al. | 707/5 |
| 2008/0065440 | A1 * | 3/2008 | Graham et al. | 705/7 |
| 2008/0077577 | A1 * | 3/2008 | Byrne et al. | 707/5 |

(Continued)

FOREIGN PATENT DOCUMENTS

| | | |
|---|---|---|
| TW | 232390 B | 5/2005 |
| TW | 284818 B | 8/2007 |

OTHER PUBLICATIONS

Anindya Ghose, Sha Yang "Comparing Performance Metrics in Organic Search with Sponsored Search Advertising", 2008 ACM.*

(Continued)

*Primary Examiner* — Polina Peach
(74) *Attorney, Agent, or Firm* — Maschoff Brennan (57) ABSTRACT

A method for optimizing search results for an entity includes determining a grouping for actions related to an entity. The grouping may include a plurality of terms. The method may also include searching a network for the terms associated with the grouping. Thereafter, results of the searches may be analyzed to determine a rank for the entity within the results.

15 Claims, 2 Drawing Sheets

(56) References Cited

U.S. PATENT DOCUMENTS

| | | | |
|---|---|---|---|
| 2008/0104113 A1* | 5/2008 | Wong et al. | 707/104.1 |
| 2008/0256061 A1* | 10/2008 | Chang et al. | 707/5 |
| 2009/0299998 A1* | 12/2009 | Kim | 707/5 |
| 2010/0023474 A1 | 1/2010 | Kejariwal et al. | |
| 2010/0030734 A1* | 2/2010 | Chunilal | 707/3 |
| 2011/0219295 A1* | 9/2011 | Adams et al. | 715/234 |
| 2012/0042051 A1* | 2/2012 | Muret et al. | 709/219 |

OTHER PUBLICATIONS

International Search Report dated Feb. 17, 2012 as received in application No. PCT/US2011/047295.

Written Opinion of the International Searching Authority dated Feb. 17, 2012 as received in application No. PCT/US2011/047295.

TW Office Action dated Dec. 2, 2013 as received in Application No. 100128576 (English Translation).

\* cited by examiner

SEARCH ENGINE OPTIMIZATION AT SCALE

BACKGROUND OF THE INVENTION

The Field of the Invention

The Internet has changed the way people gather information, establish relationships with one another and even how people communicate with one another. Additionally, the Internet has changed the way companies seek potential customers and even what the meaning of a business is. It has changed the way companies advertise, sell, coordinate with one another and compete with one another. With this change has come a huge explosion in the number of Web Pages for people to visit. Search engines, such as Google, Bing, Yahoo and others have come into being to help people find their way to Web Pages that they desire. As a result, the number and types of channels that a marketer can leverage has also exploded—beyond organic and paid search, they can also leverage blogs, social media, video sharing, mobile content, ads, display ads, and many other channels.

Additionally, tracking the behavior of the actions of each visitor would allow the Web Page to be marketed more efficiently. In particular, many Web Pages track their organic search performance in search engines based on number of visits for certain keywords. However, they cannot determine how many visitors came as a result of a particular search engine result and rank position to the Web Page, instead they must estimate this based on the data (referral header) passed to the web page which only helps them determine the number of visitors that came from a specific keyword. Without understanding key attributes of their performance on the search engine, they cannot accurately determine the effectiveness of their marketing efforts.

Accordingly, a Web Page owner might be confronted with limited marketing budgets that allow them to either improve their ranking in search engine results or that will place advertisements for their Web Page on other Web Pages but not both. Currently, the Web Page owner must choose which strategy to follow with limited information on which would be more effective.

For large websites, managing content, external references (e.g., links from third parties) and other relevant data has always been a challenge because of the scale. Consequently as a result of scale, the sheer number of Web Pages for large websites makes it impractical to apply traditional marketing analysis to apply opportunity, forecasting or even basic performance monitoring/reporting for millions of pages and millions of unique keywords associated with actions related to the entity.

Due to the issues involved with scale, marketers have no granularity in data analysis behind the measuring and management of large sites at scale for SEO. For example, sites typically only measure the number of total web pages they have indexed by search engines as a single performance metric. The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A method for optimizing search results for an entity includes determining a grouping for actions related to an entity. The grouping may include a plurality of terms. The method may also include searching a network for the terms associated with the grouping. Thereafter, results of the searches may be analyzed to determine a rank for the entity within the results.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Methods and systems are provided herein for optimizing performance of an entity with respect to a number of channels at scale. These channels may include, without limitation, all organic web channels including organic searches, organic links, paid links, page searches, linked advertisement networks, banner advertisements, contextual advertisements, e-mail, blogs, social networks, social news, affiliate marketing, mobile advertisements, media advertisements, video advertisements, videos, images, discussion forums, paid advertisements, display advertisements, news sites, rich media, social bookmarks, paid searches, wiki, mobile content, and in-game advertisements. For ease of reference, search engine results will be described herein, though it will be appreciated that the discussion may be equally applicable to the channels described above.

Searches may be performed to index references to the entity within one or more of the channels. Based on groupings of the search results, the entity can then determine how it is performing on various channels, which may include search engines. This performance analysis may be in addition to the total number of Web Pages the entity has indexed on various search engines. In the case of analyzing performance based on several meaningful groupings, a change in actions related to an entity can be more readily understood since changes can be isolated to groupings rather than to aggregate references to the entire entity. Such an approach can provide a useful degree of granularity since each grouping represents a meaningful category of data. Further, such an approach can help surface how groupings are trending as well as help identify categories for investigation.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
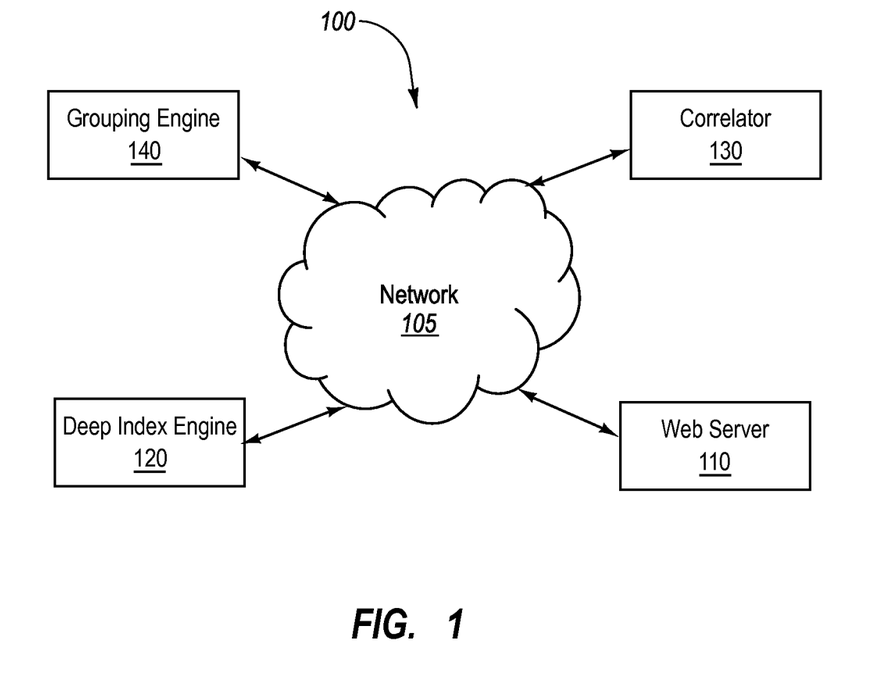
FIG. 1 illustrates a block diagram of a system for optimizing search engine results for an entity at scale.

FIG. 1 illustrates a block diagram of a system 100 for optimizing search engine references to an entity at scale. The entities whose online references are indexed can include individuals, corporations, brands, products, models or any other entities referenced anywhere on a network such as the Internet. The references may include links and/or references to one or more web pages associated with the entity. Accordingly, the references can include organic references, online advertisements, news items or any other reference to the entity. In particular, the system 100 can be used to identify, collect, and analyze meaningful groupings of terms that affect actions related to an entity, such as traffic and/or actions such as conversion events, etc. These meaningful groupings can include, without limitation, groupings or templates that are defined by a user, that are automatically generated by the system 100 based on one or more parameters, and/or some combination of the two. The groups can include, without limitation, keyword variants as well as page types and templates and users on the social web that have authority.

In addition or alternatively, the groupings may be determined by a sample (sampling) of a more comprehensive set of aggregated keywords or pages as a method for performance reporting, measurement, and forecasting against the greater set. For example, an entity may be an e-commerce site may want to know how well the entity is ranking or performing within the "BOOKS" category. The product catalog of such an entity may contain over a million different books. Instead of tracking all 1M+keywords and all the variations for the entity's "BOOKS" category, the entity may choose to create a group of 10,000 keywords that serves as a sampling or (representative set) used to measure/estimate true performing/forecasting/etc for the entire "BOOKS" category. The same can be applied to page types. In another example, an entity may be a large social website that contains millions of unique individual user profile pages. Instead of measuring all the user profile pages, the entity may choose to create a page type that consists of a representative sample of all user profile pages.

FIG. 1 shows that the system 100 can include a network 105. In at least one implementation, the network 105 can be used to connect the various parts of the system 100 to one another, such as between a web server 110, a deep index engine 120, a correlator 130, and a grouping engine 140. It will be appreciated that while these components are being shown as separate, the components may be combined as desired. Further, while one of each component is illustrated, it will be appreciated that the system 100 may include any number of each of the components shown.

As will be discussed in more detail hereinafter, the grouping engine 140 is configured to determine meaningful groupings of information to provide methods, processes and platforms to manage content and relevant marketing data (SEO metrics) at scale for large entities possessing a large amount of content and marketing data. The groupings can be user defined, customized with technology intervention, or automatically generated based on intelligent analysis that combines internal/third party/external data. As a result, the system 100 is configured to perform methods for aggregating content and SEO metrics in meaningful groupings that can then be tracked and measured. Analysis can be performed at these groupings that will give meaningful and actionable information to the marketer due to the nature of the segmentation of the groups. Exemplary configurations and functionality of the above components will be introduced below, followed by a discussion of the operation of the system to generate the groupings discussed below.

In at least one example, the network 105 includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 105 includes one or more cellular RF networks and/or one or more wired and/or wireless networks such as, but not limited to, 802.xx networks, Bluetooth access points, wireless access points, IP-based networks, or the like. The network 105 can also include servers that enable one type of network to interface with another type of network.

In at least one implementation, the web server 110 (or "webserver") can include any system capable of storing and transmitting a Web Page to a user. For example, the web server 110 can include a computer program that is responsible for accepting requests from clients (user agents such as web browsers), and serving them HTTP responses along with optional data contents, which can include HTML documents and linked objects for display to the user. Additionally or alternatively, the web server 110 can include the capability of logging some detailed information about client requests and server responses to log files.

The entity can include any number of Web Pages. The aggregation of references to the various Web Pages can be referred to as traffic. It should be noted that "Web Page" as used herein refers to any online posting, including domains, subdomains, Web posts, Uniform Resource Identifiers ("URIs"), Uniform Resource Locators ("URLs"), images, videos, or other piece of content and non-permanent postings such as e-mail and chat unless otherwise specified.

In at least one implementation, external references to a Web Page can include any reference to the Web Page which directs a visitor to the Web Page. For example, an external reference can include text documents, such as blogs, news items, customer reviews, e-mails or any other text document which discusses the Web Page. Additionally or alternatively, an external reference can include a Web Page which includes a link to the Web Page. For example, an external reference can include other Web Pages, search engine results pages, advertisements or the like. The deep index engine 120 is configured to search the network 105 to determine how the data associated with the groupings is treated by the external references and how data associated with the groupings may be applied to search results generated by search engines in particular. For example, the deep index engine 120 may be configured to search the network 105 to determine the position of the entity within search engine results when the terms associated with the groupings were used as the basis for the search.

An exemplary deep index engine is described in more detail in co-pending U.S. patent application Ser. No. 12/436,704 entitled "COLLECTING AND SCORING ONLINE REFERENCES" filed May 6, 2009, the disclosure of which is hereby incorporated by reference in its entirety.

In such an example, the deep index engine 120 creates, defines and/or identifies jobs using the terms of the groupings described above. Once the deep index engine 120 creates, defines, and/or identifies jobs based on the groupings, the deep index engine inserts the jobs, including, for search jobs, the assembled parameters of each search job, into a job queue.

Jobs in the job queue include, but are not limited to search jobs, e.g., crawling the Internet. In some embodiments, once the Internet has been crawled, data is obtained. In general, data refers to any information that the deep index engine has specified as relevant. In some embodiments, data can include information regarding the channels searched and the signals evaluated. In other embodiments, data can include downloading a Web Page for further processing or calling an API. In further embodiments, data can include search results to be parsed.

In some embodiments, once data has been obtained, it must be processed. In some embodiments, processing the data can include analyzing search engine results or analyzing API results for relevant information, such as search engine results related to the entity that are generated when the terms associated with the groupings are searched. As previously introduced, these results can allow the system to determine how the entity is performing on search engines with respect to the various groupings. By searching several meaningful groupings, a change in the number of references to an entity, as reflected by the search engine results, can be more readily understood since changes can be isolated to groupings rather than to aggregate references to the entire entity. Further, these changes can be understood by understanding the relative position of other entities when the groupings are used for the basis of the search. The search engine results related to the entity may then be optimized as desired by optimizing selected groupings. To this point, the selection of the groupings has been introduced generally as being received from a user, generated by system intelligence, or any combination of the two.

In at least one example, system intelligence may include the use of the correlator 130. An exemplary correlator is described in more detail in co-pending U.S. patent application Ser. No. 12/574,069 filed Oct. 6, 2009 and entitled "CORRELATING WEB PAGE VISITS AND CONVERSIONS WITH EXTERNAL REFERENCES" the disclosure of which is hereby incorporated by reference in its entirety. In at least one implementation, the correlator 130 can determine how visitors are directed to the entity and how those visitors behave once there. For example, the correlator 130 can determine which keywords were associated with directing the visitor to the entity and/or what types of pages the visitor accessed en route to the entity.

In at least one example, the grouping engine 140 may be configured to analyze the keywords returned by the correlator 130. For example, the grouping engine 140 may be configured to analyze the keywords returned by the correlator 130 to determine categories of keywords that appear in proximity with each other. Such an example will be discussed in more detail hereinafter. The grouping engine 140 may also be configured to cooperate with the deep index engine 120 to surface additional keyword variants or page types, which may be included in additional groupings and/or included in previously searched groupings. Accordingly, the correlator may be configured to surface terms for inclusion in the groupings based on the co-occurrence of those terms with the terms of the original groupings. Such an example will also be discussed in more detail hereinafter. Presently, a method for optimizing search engine results at scale will be discussed.

Figure 2:
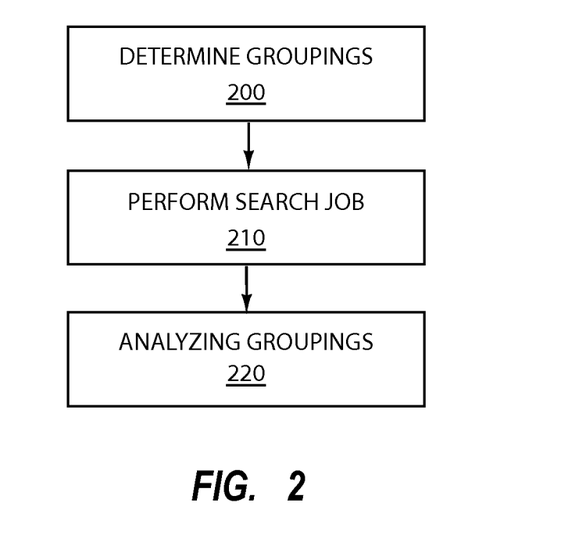
FIG. 2 is a flow diagram illustrating a method of optimizing search engine results for an entity at scale.

FIG. 2 illustrates a flowchart of an exemplary method of optimizing search engine results at scale for an entity. The method can be implemented using software, hardware or any combination thereof. If the method is implemented using hardware, the steps of the method can be stored in a computer-readable medium, to be accessed as needed to perform their functions. Additionally, if the method is implemented using hardware, the steps can be carried out by a processor, field-programmable gate array (FPGA) or any other logic device capable of carrying out software instructions or other logic functions.

Additionally or alternatively, the method can be implemented using a server or other single computing environment. If a server or other single computing environment is utilized, the conversions need not be divided into groups, since all conversions will be analyzed by the same server or single computing environment. Accordingly, less overall processing can be necessary. However, the server or single computing environment can experience downtime or otherwise delay the results.

As illustrated in FIG. 2, the method begins at step 200 by determining groupings. These groupings may include user-defined groupings, automatic system-defined groupings or some combination of the two. An exemplary method for determining groupings will be discussed in more detail with reference to FIG. 3.

With continuing reference to FIG. 2, once the groupings have been determined, the method continues at 210 by performing one or more search jobs in which the terms associated with the groupings determined at step 200 are searched. The terms associated with the groupings may be searched individually and/or in any desired combination.

Once the search jobs have been performed, at step 220, the results of the search jobs are analyzed and the groupings are managed. For example, the output of various search engines may be analyzed to determine where an entity is positioned when the terms associated with the groupings are searched. Analysis can then be conducted to map out and identify the best performing groupings and to determine keyword variants. An exemplary method of analyzing the results of the search job will be discussed in more detail with reference to FIG. 4.

Figure 3:
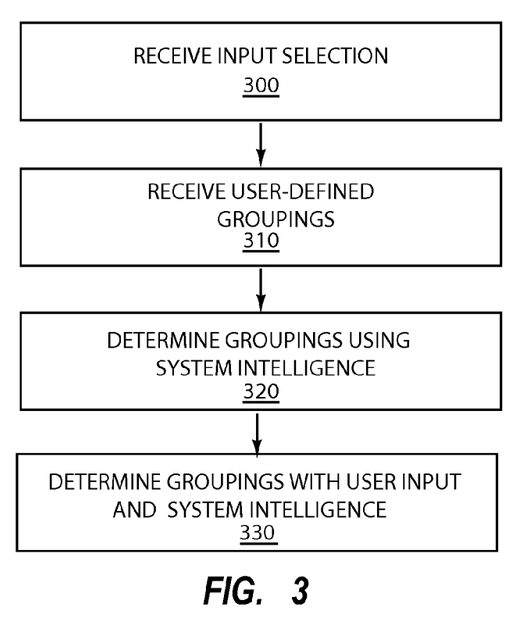
FIG. 3 illustrates a method of determining groupings according to one example.

FIG. 3 illustrates a method for determining groupings according to one example. The method can be implemented using software, hardware or any combination thereof. If the method is implemented using software, the steps of the method can be stored in a computer-readable medium, to be accessed as needed to perform their functions. Additionally, if the method is implemented using software, the steps can be carried out by a processor, a field-programmable gate array (FPGA) or any other logic device capable of carrying out software instructions or other logic functions.

Additionally or alternatively, the method can be implemented using a server or other single computing environment. If a server or other single computing environment is utilized, the conversions need not be divided into groups, since all conversions will be analyzed by the same server or single computing environment. The method begins at step 300 by receiving an input selection as to whether the groupings will be defined by a user as at step 310, determined by system intelligence as at step 320, or determined by a combination of the two as at step 330. The selection as to how the groupings are to be determined may be received in any desired manner, such as through the use of input/output devices. This input may be received at an initial setup stage, received before each search is performed, or received at any desired time.

With respect to step 310, if the received selection indicates that the groupings are to be user defined, the user may define the groupings in any desired manner. For example, the user may directly define the groupings. In particular, with respect to user-defined groupings, users may be aware of keywords, keyword variants, or keyword categories for actions that are related to the entity, such as traffic, events/interaction with the website including conversion events, purchase/sale, download, signup, or any other actions. For example, a user may define groups such as keyword groupings based on keyword category or keyword variant that combine laudatory words, a category of interest, and a geographical category. One such exemplary grouping could include the phrase "best restaurants"+[city] (e.g., best restaurants in San Francisco, best restaurants in New York, etc).

Accordingly, the external reference can include a group of external references. For example, a webmaster can be interested in the number of conversions based on a search that includes different city names. For example, if a business is located in numerous cities, the webmaster can be interested in the number of conversions that come from a keyword search that includes any of the city names, regardless of which city is actually searched. Accordingly, the external references can be grouped with one another, regardless of which city is actually searched.

In addition to entering keywords directly, users may also be able to group pages by page type. For example, a user may be able to group product page types, editorial pages, blog posts, or other categories together. In at least one example, a user may create user-defined templates by grouping page types together as desired. Further, user-defining groupings at step 310 may also include receiving input to combine pages by variables such as page name, title, uniform resource locator (URL), sponsored link costs, or other properties that can be provided by the user. Accordingly, the method may include receiving input to establish various groupings of search parameters as defined by the user.

As introduced, the method may also include determining groupings automatically. Accordingly, with respect to step 320, if the received selection indicates that groupings are to be determined by system intelligence, the system may at least initially receive input to guide the search. In other examples, the determination may be performed automatically without user intervention.

In the case that user guidance is initially provided, the system may receive input to select general parameters for the system to search. For example, the system may receive input selecting the top keywords that drive traffic or volume to the entity. In such an example, the system may automatically group these keywords. Further, the system may also receive input to select page types, page names, uniform resource locators, or other categories or classifications of web pages that affect traffic in a selected manner. Additionally, the system may also receive input to select top pages that dropped in user visits, conversions, or other performance metrics as desired. The system may then automatically generate groupings based on any or all of these inputs. Accordingly the method may include receiving input to establish various groupings of search parameters automatically.

With respect to step 330, if the received selection indicates that groupings are to be determined by a combination of system intelligence and user-defined terms, the system intelligence and user input can be combined in any desired manner. For example, the system may receive the input described above in determining user-defined groupings. Based on the result of the groupings, the system may automatically perform a search to identify keywords, phrases, page types, or any other data that is frequently associated with the user-defined groupings. The system may then automatically combine the surfaced keywords, phrases, pages types, etc. and the user-defined search terms into groupings that may then be searched again as desired. Further, a frequency analysis may be conducted on the search results with respect to competitors to determine additional keyword variants and/or other correlations. The searching may be performed automatically or may be performed in response to additional input as desired. Accordingly, the method may combine user input and system intelligence to determine groupings to be searched. Further, as described above, search results may be used in further determining and/or refining groupings as desired.

Additionally or alternatively, automatic groupings may be based on seasonality or current events. In particular, some keywords are searched more frequently based on the time of year, such as the searching of terms related to Christmas trees during the months of November and December.

As previously introduced, determining groupings may be part of a method for optimizing search engine results for an entity at scale. Once the groupings have been determined, they can be used as search terms in analyzing search results. Once a search job has been performed, the results may be analyzed and the groupings managed.

Figure 4:
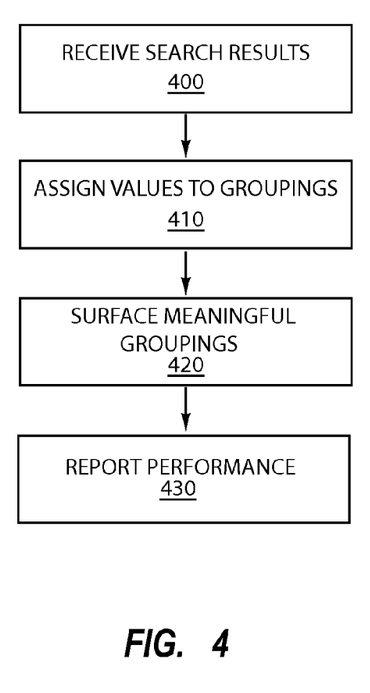
FIG. 4 illustrates a method of analyzing and optimizing search results for an entity at scale.

One exemplary method of analyzing search results and managing the groupings is shown in FIG. 4. The method can be implemented using software, hardware or any combination thereof. If the method is implemented using software, the steps of the method can be stored in a computer-readable medium, to be accessed as needed to perform their functions. Additionally, if the method is implemented using software, the steps can be carried out by a processor, field-programmable gate array (FPGA) or any other logic device capable of carrying out software instructions or other logic functions.

Additionally or alternatively, the method can be implemented using a server or other single computing environment. If a server or other single computing environment is utilized, the conversions need not be divided into groups, since all conversions will be analyzed by the same server or single computing environment. Accordingly, less overall processing can be necessary. However, the server or single computing environment can experience downtime or otherwise delay the results.

As illustrated in FIG. 4, the method begins by receiving the search results for the terms associated with a grouping from a search at step 400. Thereafter, at step 410, the method may include assigning values to each of the terms associated with the groupings. In at least one example, assigning values to each of the terms may include determining a conversion rate of each of the terms, including the conversion rate associated with page types, keyword variants, and/or other desired criteria. Determining the conversion rate of each of the terms may include determining which terms drive traffic to the site, determining which visits were converted, and correlating converted visits with the terms that drive the traffic. The conversion rate may be assigned a value based on any desired criteria, which may include numbers of conversions, total monetary value of the conversions, ratio of conversions to visits, some combination of the preceding, or any other desired criteria.

In at least one implementation, correlating external references to a Web Page with the number of conversions on the Web Page can allow the webmaster to determine the number of conversions provided by each external reference. This can, in turn, allow a webmaster to focus on increasing the number or quality of references that will best lead to an increased number of conversions on the Web Page. For example, correlating keyword searches and the ranking of the Web Page within the search results, in search engines that include a reference to the Web Page, can allow a webmaster to focus on improving the ranking of the Web Page in searches for identified keywords that are more likely to lead to a greater number of conversions. Correlating conversions by a visitor on a Web Page with an external reference can allow a webmaster to determine which external references are best at producing conversions.

Additionally or alternatively, the value of each of the terms may be assigned by determining the estimated search frequency of the terms associated with each grouping. The system may estimate the search frequency of the terms associated with each by determining which external references linked to the web page and performing analytics on the external reference. These analytics may include crawling the references and determining the keyword frequency on each of the pages. In at least one implementation, the analytics of the external reference can include one or more channels. In particular, channels can include organic searches, organic links, paid links, page searches, linked advertisement networks, banner advertisements, contextual advertisements, e-mail, blogs, social networks, social news, affiliate marketing, mobile advertisements, media advertisements, video advertisements, videos, images, discussion forums, paid advertisements, display advertisements, news sites, rich media, social bookmarks, paid searches, wiki, mobile content, and in-game advertisements. Nevertheless, the channels are not limited to those mentioned, but can include any relevant areas of the network, whether now existing or created in the future.

Additionally or alternatively, the analytics of the external reference can include one or more signals. In at least one implementation, the one or more signals include information about the external references to the Web Page. For example, advertisements placed at the top of a Web Page are much more visible, and therefore, are generally more expensive and are considered more effective than advertisements placed at the bottom of a Web Page. Therefore, if the external reference includes online advertisements, advertisement placement is an analytic of the Web Page that can be evaluated.

Alternately or additionally, the one or more signals can include a keyword used in a search which identified the Web Page and the ranking of the Web Page within the search, and the competitive listings (other pages that rank within the search). Additionally or alternatively, the one or more signals can include one or more of: calendar date of the external reference, time of day the external reference was accessed or the like.

As previously introduced, automatically determining groupings may include conducting a word frequency analysis search for each of the terms with respect to competitive listings. Using these results, the method at step 420 may further include surfacing meaningful groupings. Surfacing meaningful groupings may include crawling the competitive listings and other references in the search results described above and determining the keyword frequency on each of the pages.

Additionally of alternatively, incoming links from third party websites may be grouped into meaningful page types (based on the content of the page) for the purpose of conducting analysis to understand the value of a link from a given page type or the value to the business of actions related to the entity that are driven from a given page type. These results may provide meaningful insight and actionable opportunities based on aggregated data analysis applied to individual groupings, combinations of groupings, or by comparing groupings.

Accordingly, the method may include at step 430 performance reporting by grouping. Reporting performance by grouping may include simultaneous displaying each of the results described above. These results may allow the entity to diagnose business performance. In particular, if overall actions related to the entity or conversions have dropped, the display may allow the entity to identify what classes of keyword variants or page types are dropping. Further, based on the results above, these results can be selected as desired to focus on areas of concern or to identify opportunities as desired.

Performance reporting by group can also include displaying cost parameters, such as project costs, lead times, or other investment parameters along with the results previously described. Displaying the cost parameters can allow marketers to understand and test a segment before scaling content for the segment. Further, such a display can allow for effective project and campaign management.

In particular, before embarking on a new content campaign, a forecaster may be able to use the parameters shown on the report to forecast the return on investment of the potential campaign based on the targeted value of the keyword variant or page type. Once the campaign has been initiated, the display may allow the marketer to readily measure the return on investment of the campaign against effort, including costs and time.

Accordingly, methods and systems have been provided herein for optimizing search engine results relative to an entity at scale. In at least one example, a method for search engine result optimization includes identifying groupings of data such as keyword variants or page types that affect actions related to the entity. Searches are then performed on various search engines using the identified groupings as a basis for the searches. Based on the search results, the entity can then determine how it is performing on search engines with respect to the various groupings. This performance analysis may be in addition to the total number of Web Pages the entity has indexed on various search engines. In the case of analyzing performance based on several meaningful groupings, a change in actions related to the entity can be more readily understood since changes can be isolated to groupings rather than to aggregate references to the entire entity. Such an approach can provide a useful degree of granularity since each grouping represents a meaningful category of data. Further, such an approach can help surface how groupings are trending as well as help identify categories for investigation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to optimize search results related to a website of an entity, the method comprising:
   determining a grouping of terms predetermined to be related, the terms affecting actions of visitors to a webpage of an entity;
   for one or more of the terms in the grouping of terms, performing a keyword search based on at least one of the terms in the grouping, the keyword search comprising:
      selecting, by a computer system, at least one of the terms in the grouping;
      generating, by the computer system, a search request for the selected at least one term to be sent to at least one third party search engine, the search request being based on the grouping of terms;
      sending the search request for the selected at least one term to the at least one third party search engine;
      importing, by the computer system, a third party search engine results page from the at least one third party search engine, wherein the third party search engine results page includes ranked organic third party search engine results that do not include paid search results;

determining whether the ranked organic third party search engine results include an organic third party search engine result that includes a reference to the webpage of the entity;

in response to determining that the ranked organic third party search engine results include the organic third party search engine result that includes the reference to the webpage of the entity, analyzing the ranked organic third party search engine results to identify a rank for the organic third party search engine result with the reference to the webpage of the entity within the ranked organic third party search engine results based on a position of the organic third party search engine result with the reference to the webpage of the entity with respect to positions of other organic third party search engine results on the third party search engine results page; and correlating the keyword search with the rank for the organic third party search engine result with the reference to the webpage of the entity; and correlating the reference to the webpage of the entity with conversions on the webpage of the entity to determine a number of conversions provided by the reference of the webpage;

repeating the above steps for multiple groupings of terms; and comparing the multiple groupings of terms based on the ranks correlated with the keyword searches in each of the multiple groupings of terms and the number of conversions provided by the references of the webpages.

2. The method of claim 1, further comprising optimizing references to the webpage of the entity to improve the rank of the reference to the webpage of the entity within the third party search engine results when the terms of the grouping are searched.

3. The method of claim 1, wherein determining the grouping of terms includes receiving user input to define a user-defined grouping of terms.

4. The method of claim 1, wherein determining the grouping of terms includes automatically determining the grouping of terms based on previous conversions associated with the terms.

5. The method of claim 1, wherein determining the grouping of terms includes determining term variants.

6. The method of claim 5, wherein term variants include syntax combination of the terms identified by at least one of user input and system intelligence.

7. The method of claim 1, wherein determining the grouping of terms includes grouping references to the webpage of the entity according to page type by using mechanisms that include at least one of passing in the page type through a function call, matching a pattern of a uniform resource locator, or by performing pattern matching on content of the terms.

8. The method of claim 7, wherein determining the grouping of terms according to page type includes determining page types that drive actions related to the webpage of the entity.

9. The method of claim 1, wherein analyzing the ranked organic third party search engine results includes crawling the ranked organic third party search engine results.

10. The method of claim 9, further comprising performing a keyword frequency analysis on the ranked organic third party search engine results crawled during the crawling step.

11. The method of claim 10, further comprising grouping terms identified during the crawling step with the terms of the grouping.

12. The method of claim 9, wherein crawling the ranked organic third party search engine results includes identifying page types of references within the ranked organic third party search engine results.

13. A method to optimize search results related to a website of an entity, the method comprising:

selecting first and second page types from a plurality of webpage types;

grouping a first set of webpages from a plurality of webpages of an entity based on the first set of webpages being the first page types;

grouping a second set of webpages from the plurality of webpages of the entity based on the second set of webpages being the second page types;

determining a first grouping of keywords associated with the first set of webpages;

determining a second grouping of keywords associated with the second set of webpages;

for one or more of the keywords in each of the first and second groupings of keywords, performing a keyword search, comprising:

selecting one of the keywords in the first and second groupings of keywords;

generating, by a computer system, a search request for the selected keyword to be sent to at least one third party search engine, the search request being based on the grouping of keywords;

sending the search request for the selected keyword to the at least one third party search engine;

importing, by the computer system, a third party search engine results page from the at least one third party search engine, wherein the third party search engine results page includes ranked organic third party search engine results that do not include paid search results;

determining whether the ranked organic third party search engine results include an organic third party search engine result that includes a reference to the webpage of the entity;

in response to determining that the ranked organic third party search engine results include the organic third party search engine result that includes the reference to the webpage of the entity, analyzing the ranked organic third party search engine results to identify a rank for the organic third party search engine result with the reference to the webpage of the entity within the ranked organic third party search engine results based on a position of the organic third party search engine result with the reference to the webpage of the entity with respect to positions of other organic third party search engine results on the third party search engine results page; and correlating the keyword search with the rank for the organic search third party search engine result with the reference to the webpage of the entity; and correlating the reference to the webpage of the entity with conversions on the webpage of the entity to determine a number of conversions provided by the reference of the webpage; and comparing the first set of webpages with the second set of webpages based on the ranks correlated with the keyword searches in the first and second groupings of keywords and the number of conversions provided by the references of the webpages.

14. The method of claim 13, wherein acts of generating the search request, sending the search request, importing the third party search engine results page, determining whether the ranked organic third party search engine results include the reference to the webpage, analyzing the ranked organic third party search engine results, and correlating the keyword search with the rank for the organic third party search engine result with the reference to the webpage of the entity occur after the grouping of the first and second webpages.

15. One or more non-transitory computer-readable media storing one or more programs that causes one or more processors to execute operations to optimize search results related to a website of an entity, the operations comprising:

determining a grouping of terms predetermined to be related, the terms affecting actions of visitors to a webpage of an entity;

for one or more of the terms in the grouping of terms, performing a keyword search based on at least one of the terms in the grouping, the keyword search comprising:

selecting, by a computer system, at least one of the terms in the grouping;

generating, by the computer system, a search request for the selected at least one term to be sent to at least one third party search engine, the search request being based on the grouping of terms;

sending the search request for the selected at least one term to the at least one third party search engine;

importing, by the computer system, a third party search engine results page from the at least one third party search engine, wherein the third party search engine results page includes ranked organic third party search engine results that do not include paid search results;

determining whether the ranked organic third party search engine results include an organic third party search engine result that includes a reference to the webpage of the entity;

in response to determining that the ranked organic third party search engine results include the organic third party search engine result that includes the reference to the webpage of the entity, analyzing the ranked organic third party search engine results to identify a rank for the organic third party search engine result with the reference to the webpage of the entity within the ranked organic third party search engine results based on a position of the organic third party search engine result with the reference to the webpage of the entity with respect to positions of other organic third party search engine results on the third party search engine results page; and correlating the keyword search with the rank for the organic third party search engine result with the reference to the webpage of the entity; and correlating the reference to the webpage of the entity with conversions on the webpage of the entity to determine a number of conversions provided by the reference of the webpage;

repeating the above steps for multiple groupings of terms; and comparing the multiple groupings of terms based on the ranks correlated with the keyword searches in each of the multiple groupings of terms and the number of conversions provided by the references of the webpages.

\* \* \* \* \*